United States Patent
Tanev

(10) Patent No.: US 8,651,153 B2
(45) Date of Patent: Feb. 18, 2014

(54) DEVICE FOR INCREASING TIRE FRICTION AND METHOD OF USING THE SAME

(76) Inventor: Tihomir Zhelev Tanev, Stara Zagora (BG)

( * ) Notice: Subject to any disclaimer, the term of this patent is extended or adjusted under 35 U.S.C. 154(b) by 607 days.

(21) Appl. No.: 12/951,385

(22) Filed: Nov. 22, 2010

(65) Prior Publication Data

US 2012/0125503 A1 May 24, 2012

(51) Int. Cl.
*B60C 27/10* (2006.01)

(52) U.S. Cl.
USPC ............ 152/216; 152/222; 152/218; 152/226

(58) Field of Classification Search
USPC ............ 152/208, 213 A, 216, 218, 222, 233, 152/241, 213 R, 217, 221, 225 R, 226, 227, 152/228, 229, 230; 301/40.2, 41.1, 46, 47; 180/16; 280/757
See application file for complete search history.

(56) References Cited

U.S. PATENT DOCUMENTS

| | | | | |
|---|---|---|---|---|
| 1,755,160 A * | 4/1930 | Grant | ............................ | 301/46 |
| 2,308,619 A * | 1/1943 | Lapidovsky | ................. | 152/216 |
| 2,423,759 A * | 7/1947 | Edwards | .................... | 152/225 C |
| 2,837,133 A * | 6/1958 | Armenante et al. | ........... | 152/218 |
| 3,804,141 A * | 4/1974 | Huttner | .......................... | 152/208 |
| 3,893,501 A * | 7/1975 | Brummer et al. | .......... | 152/213 R |
| 3,982,788 A * | 9/1976 | Arney | ............................ | 301/44.4 |
| 4,089,359 A * | 5/1978 | Jones | ............................ | 152/216 |
| 4,222,425 A * | 9/1980 | Bindel | .......................... | 152/234 |
| 4,287,926 A * | 9/1981 | Wong | ........................ | 152/225 C |
| 4,735,248 A * | 4/1988 | Cizaire | ..................... | 152/213 A |
| 4,862,936 A * | 9/1989 | McDonough | ................. | 152/216 |
| 5,785,783 A * | 7/1998 | Thioliere | ..................... | 152/216 |
| 6,619,353 B1* | 9/2003 | Kim | .......................... | 152/225 R |
| 6,915,825 B1* | 7/2005 | Stevenson, Jr. | ............... | 152/218 |
| 7,036,542 B2* | 5/2006 | Kaiser et al. | .................. | 152/218 |
| 7,066,227 B1* | 6/2006 | Stevenson, Jr. | ............... | 152/222 |
| 7,118,130 B2* | 10/2006 | Rosenbalm | .................. | 280/757 |
| 7,677,285 B2* | 3/2010 | Lynn | ............................ | 152/218 |
| 2002/0117245 A1* | 8/2002 | Martinez | ....................... | 152/218 |
| 2007/0169866 A1* | 7/2007 | Lynn | ............................ | 152/217 |
| 2007/0199635 A1* | 8/2007 | McCauley et al. | ........... | 152/217 |

* cited by examiner

*Primary Examiner* — Kip T Kotter
(74) *Attorney, Agent, or Firm* — Justin Lampel

(57) ABSTRACT

A device and method for increasing tire friction is provided. The device is especially suitable for use on slippery roads, such as roads which have snow and/or ice. The device is permanently secured to the vehicle wheel assembly and easily installed over the tire for use. The device has a plurality of friction grips which independently move from an inactive first position secured to a sidewall of a housing center of the device to an active second position secured over the tire of the vehicle wheel assembly.

24 Claims, 12 Drawing Sheets

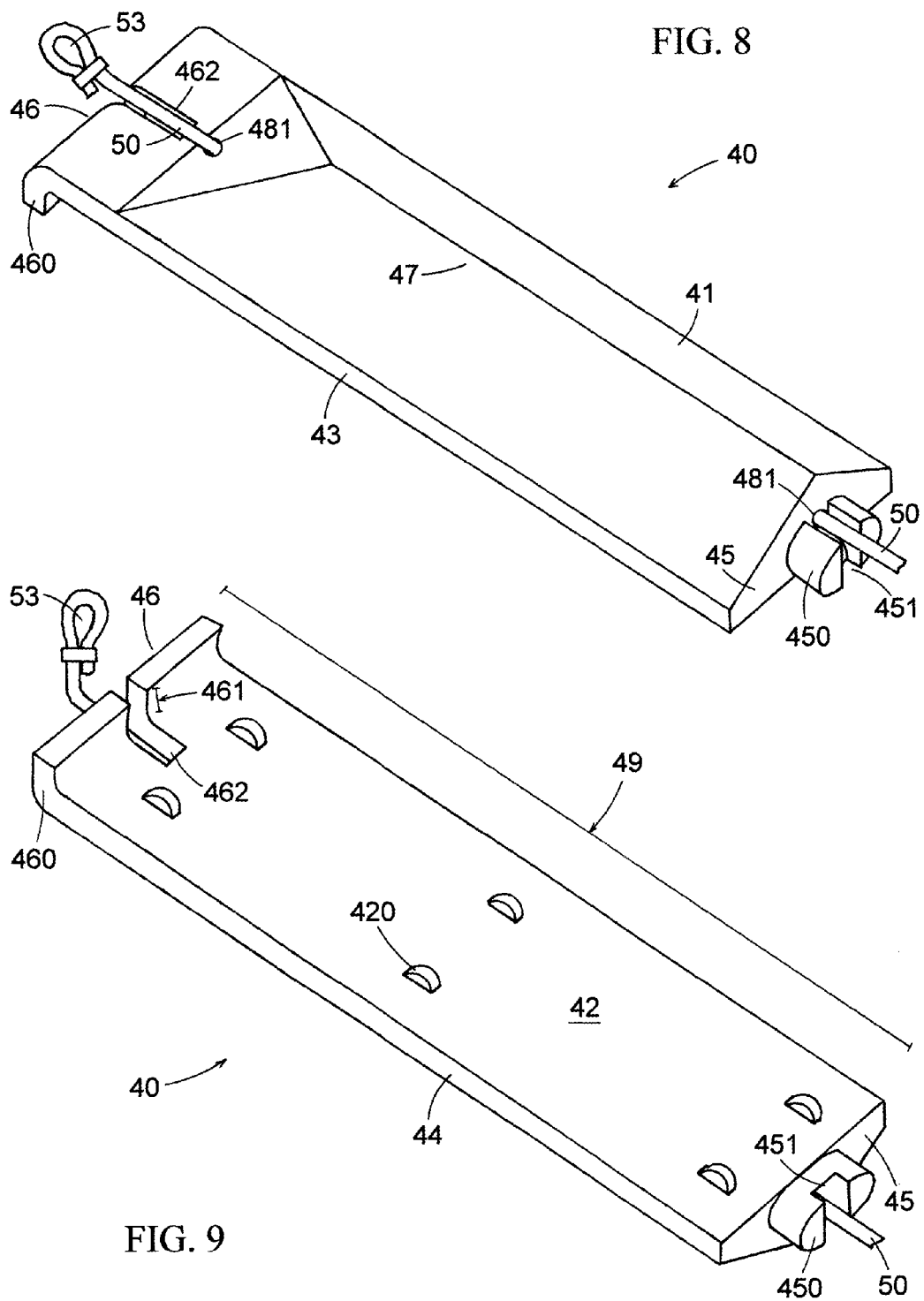

DEVICE FOR INCREASING TIRE FRICTION AND METHOD OF USING THE SAME

BACKGROUND OF THE INVENTION

A device and method for increasing friction of a tire is provided. The device is especially suitable for use on slippery roads, such as roads which have snow and/or ice. The device is permanently secured to the vehicle wheel assembly and easily installed over the tire for use. The device has a plurality of friction grips which independently move from an inactive first position secured to a sidewall of a housing center of the device to an active second position secured over the tire of the vehicle wheel assembly.

It is known to use devices to increase the friction of a tire on certain surfaces, especially on snowy roads in the winter. Existing tire chains are generally secured around a tire and tightened such that the chains and tire move synchronously over the surface of the road. Most of these devices require a user to completely install the friction increasing device (often called "snow chains") just prior to use and require the complete removal of the device after use. Failure to remove the device on roads which lack snow or ice can result in damage to the wheel, vehicle and road surface and may further be illegal in some jurisdictions.

The most common device used is the conventional tire chain wherein chains wrap around the tire and are tightened to the wheel. The chains then rotate along with the tire. Disadvantages with these devices include the fact that these devices are often difficult and complicated to install over a wheel, especially in harsh weather conditions. Further, these devices are generally heavy to transport and lift. In addition, the installation process is lengthy as the driver must generally place the chains on the ground and then slowly move the vehicle forward or backward over the chains while securing the chains the wheel. Cleaning, folding and storing of these devices are also challenging. Even further, these devices are expensive and generally need to be completely replaced if even a single link of the chain is damaged or broken. Finally, these existing tire chains are generally built for specific size and weight tires and generally cannot be used on alternative tires. In extreme cases, some drivers may stretch or lay the chains over the road surface, without securing them around the tire. The driver may then drive over the unsecured chains to remove the vehicle from being stuck. After becoming free, it is not uncommon for a driver to leave the chains on the road and to continue to drive for fear of becoming stuck again if he or she stops the vehicle to retrieve the chains.

For example, U.S. Pat. No. 6,619,353 to Kim disclose an apparatus for preventing a tire from slipping. The apparatus for preventing the slipping of a tire includes a wire having separable coupling units connected at both ends of the wire at an inner side of a tire for thereby forming a circle shape having a diameter smaller than an outer diameter of the tire, a plurality of friction members each having one end connected to the wire at a certain regular distance and extended from the wire across a grounding surface of the tire to an outer side of the tire and arranged along a grounding surface of the tire at a certain regular distance, a straight line movement conversion mechanism inserted in an outer center portion of the tire for converting a moment generated in a handle in a radial direction from the center into a tension force in the center direction and applying the tension force to the other ends of the friction members, a reverse rotation prevention unit for preventing a reverse rotation of the straight line movement conversion mechanism, and a pulling apparatus for closely contacting the friction members to the tire by preventing a reverse rotation using the reverse rotation prevention unit wherein the straight line movement conversion mechanism pulls the other ends of the friction members in the center direction of the tire based on the moment applied the handle.

U.S. Pat. No. 5,785,783 to Thioliere discloses a tire chain assembly including two stays hinged at one end on a housing and supporting wall chains which hold tread chains in place on the tread of the tire when they are pulled tight as the stays are drawn together by a resilient linkage. Arms or resilient linkages control displacement and vibration of the stays when the wheel is moving. The device enables gripping equipment to be fitted quickly and easily and is suitable for use on snow-covered, muddy, sandy, or vegetation-covered terrain.

U.S. Pat. No. 4,287,926 to Wong discloses a traction device for automotive vehicles stuck in snow, mud, and the like by a device applied over the outer face of the slipping driven vehicle wheel and having J-shaped traction fingers draped over the tire of the wheel and fixedly clamped on the tire by merely swinging a lever. The device has a mounting plate for overlying the conventional wheel disk or hubcap, three J-shaped fingers pivoted to the center of the plate and radially guided in 120.degree. spaced apart relation at the periphery of the plate with the cups of the fingers receiving the tire and presenting outer tread surfaces which will bite into the slippery road bed. One of the fingers is retracted on its pivot by a lever or handle effective to clamp all three of the fingers on the tire.

U.S. Pat. No. 4,222,425 to Bindel discloses a tire traction chain for automobiles, trucks and the like whereby the same is placed over the tire and secured at one end to arcuate slots in the wheel and at the other end to a lug bolt.

U.S. Pat. No. 3,893,501 to Brumnier discloses a skid chain construction including at least one pair of skid chain assemblies and each skid chain assembly includes a pair of generally arcuate and parallel anchor assemblies. A plurality of elongated flexible traction members extend between and are secured to corresponding portions of the anchor assemblies spaced therealong. A mounting adapter plate including a central portion provided with a pattern of apertures formed therethrough for registry with the wheel mounting lugs of a vehicle hub portion is also provided and may be mounted on an associated vehicle hub portion between the hub portion and the associated vehicle wheel. The adapter plate includes at least one pair of diametrically opposite radially outwardly extending support arms including outer end portions deflected outwardly to one side of the adapter plate and the outer end portions of the support arms have corresponding ends of a pair of elongated attaching links pivotally attached thereto for oscillation about parallel axes disposed generally normal to the plane in which the adapter plate is disposed. Corresponding anchor assemblies of the pair of skid chain assemblies have their mid-portions attached to the other pair of ends of the attaching links and longitudinally spaced portions of each of the other anchor assemblies have lengths of elongated flexible tension members anchored thereto. An elongated adjustable length tension member is secured between the ends of the pairs of lengths of flexible tension members remote from the corresponding anchor assemblies and the adjustable length tension member may be utilized to tighten the pair of skid chain assemblies about an associated vehicle wheel with the elongated flexible traction members extending over the tread portions of the wheels.

However these patents fail to disclose a device which allows a user to easily and permanently install a tire traction device on a wheel which may be easily moved from a non-function first position to a functional second position.

Accordingly, a need exists for a new and improved device and method of use of the same for a device for increasing tire traction on vehicles.

SUMMARY OF THE INVENTION

A device and method for increasing friction of a tire is provided. The device is especially suitable for use on slippery roads, such as roads which have snow and/or ice. The device is permanently secured to the vehicle wheel assembly and easily installed over the tire for use. The device has a plurality of friction grips which independently move from an inactive first position secured to a sidewall of a housing center of the device to an active second position secured over the tire of the vehicle wheel assembly.

An advantage of the present apparatus and method of using the same is to provide a device for increasing the friction of a tire wherein the device is permanently secured to the wheel.

Yet another advantage of the present apparatus and method of using the same is to provide a device for increasing the friction of a wheel which is easy to install and remove from the surface of the tire.

An advantage of the present apparatus and method of using the same is to provide a device for increasing the friction of a tire which is easy to transport.

Still another advantage of the present apparatus and method of using the same is to provide a device for increasing the friction of a tire which is suitable for use on wheels or rims of various sizes.

And an advantage of the present apparatus and method of using the same is to provide a device for increasing the friction of a tire which is relatively inexpensive over the long run compared to traditional tire chains, especially when these traditional tire chains need replacing.

Yet another advantage of the present apparatus and method of using the same is to provide a device which increases stability of a vehicle on, for example, an icy surface.

Still another advantage of the present apparatus and method of using the same is to provide a device which requires no additional parts be used which are not already secured to the wheel.

An advantage of the present apparatus and method of using the same is to provide a device for increasing friction of a wheel which is easy to clean.

And an advantage of the present apparatus and method of using the same is to provide a tire traction device which allows a driver to deliver his or her cargo faster, thereby increasing profits.

Yet another advantage of the present apparatus and method of using the same is to provide a tire traction device which uses centripetal force to expel debris, rocks, snow, ice or the like from itself.

Still another advantage of the present apparatus and method of using the same is to provide a device for increasing friction of a wheel which does not require the user to store the device inside the vehicle, thereby taking up space in the vehicle.

Yet another advantage of the present apparatus and method of using the same is to provide a tire traction device which allows a driver to save on installation and reinstallation time of the tire traction device.

And another advantage of the present apparatus and method of using the same is to provide a device for increasing friction of a tire with respect to the road.

An advantage of the present apparatus and method of using the same is to provide a device for increasing friction of a tire on a slippery road wherein a driver may selectively elect to use less than all of the friction grips of the device during actual use or use less than all the friction grips if one or more of the friction grips are damaged.

And an advantage of the present apparatus and method of using the same is to provide a device for increasing friction of a tire on a slippery road wherein the device allows a user to predict when a part of the device needs replacing prior to the part failing.

BRIEF DESCRIPTION OF THE DRAWINGS

FIG. 8 is a perspective view of the top side of the first embodiment of the friction grip.

FIG. 9 is a perspective view of the underside of the first embodiment of the friction grip.

Some of the elements of the device are not depicted on some of the figures for the purpose of better understanding and clarity of view.

DETAILED DESCRIPTION OF THE INVENTION

A device and method for increasing friction of a tire is provided. The device is especially suitable for use on slippery roads, such as roads which have snow and/or ice. The device is permanently secured to the vehicle wheel assembly and easily installed over the tire for use. The device has a plurality of friction grips which independently move from an inactive first position secured to a sidewall of a housing center of the device to an active second position secured over the tire of the vehicle wheel assembly.

Figure 1:
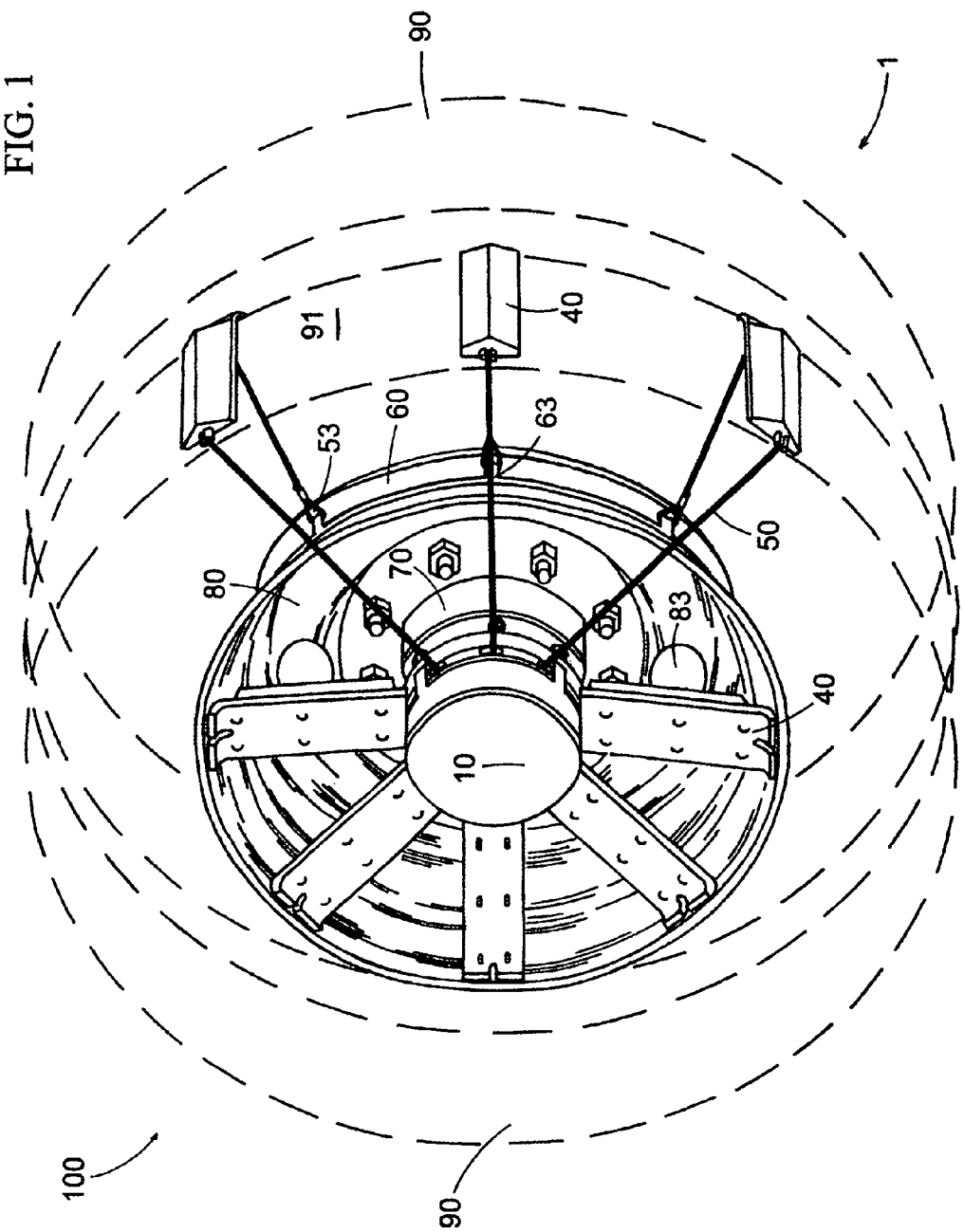
FIG. 1 is a perspective view illustrating the storage and the use of the device as installed on a dual wheel assembly, according to the first embodiment of the center housing of the present invention.
Figure 2:
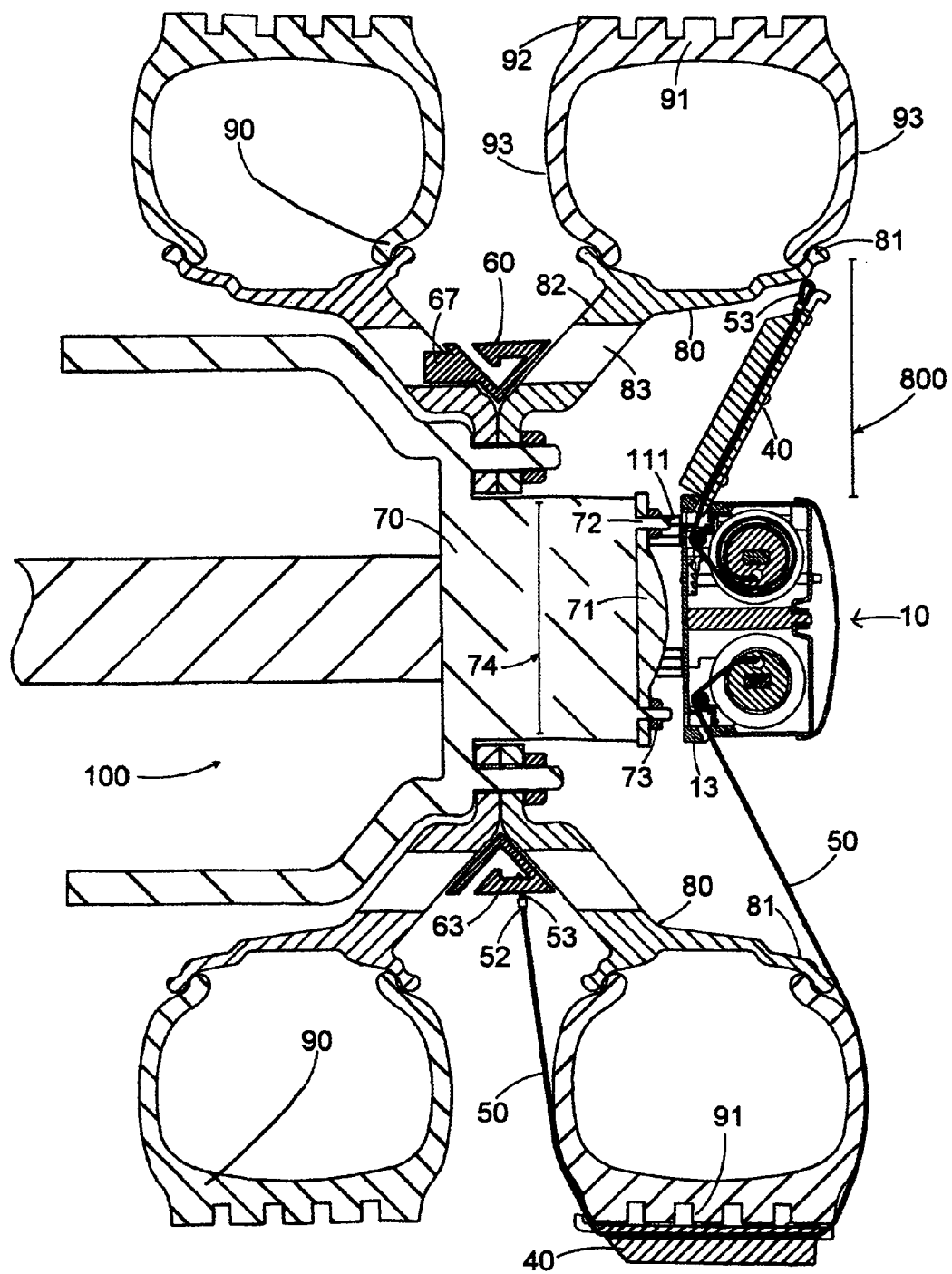
FIG. 2 is a sectional view, taken by the center (diameter) of a dual wheel assembly with the device installed, according to the first embodiment of the center housing of the present invention.

As depicted in FIG. 1 and FIG. 2, the device 1 is permanently secured to the vehicle wheel assembly 100 and easily installed over the tire 90 for use. For better understanding the device 1 may be informally considered as a plurality of three separable and relatively independent units: a detachable center housing 10, a plurality of friction grips 40 and a detachable securing disk 60. It should be noticed that various combinations between the above units may be used in practice. As mentioned below, it may not be necessary all of the above units to be used.

Figure 6:
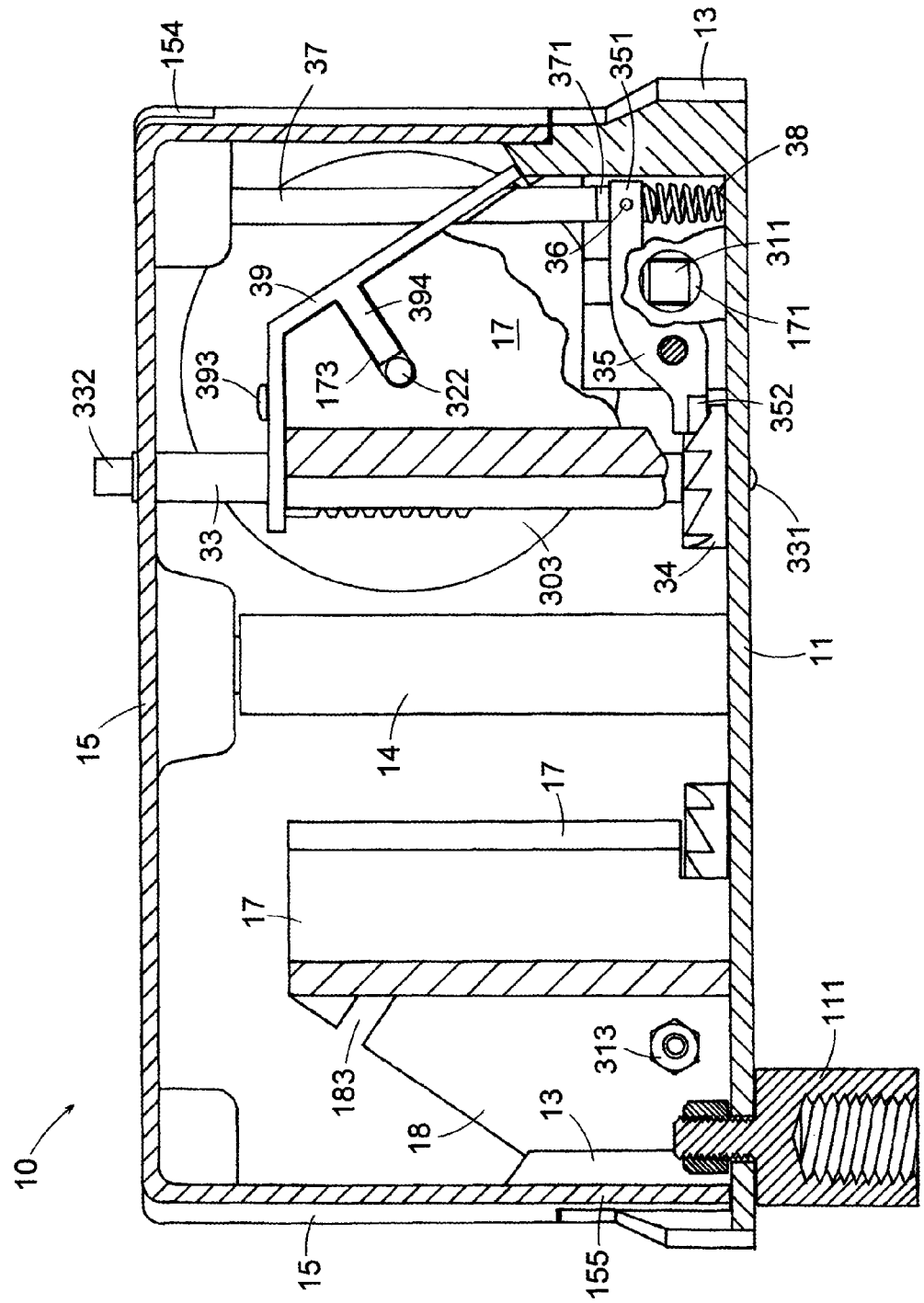
FIG. 6 illustrates a cross-sectional view taken by the line III-III of FIG. 3.
Figure 7:
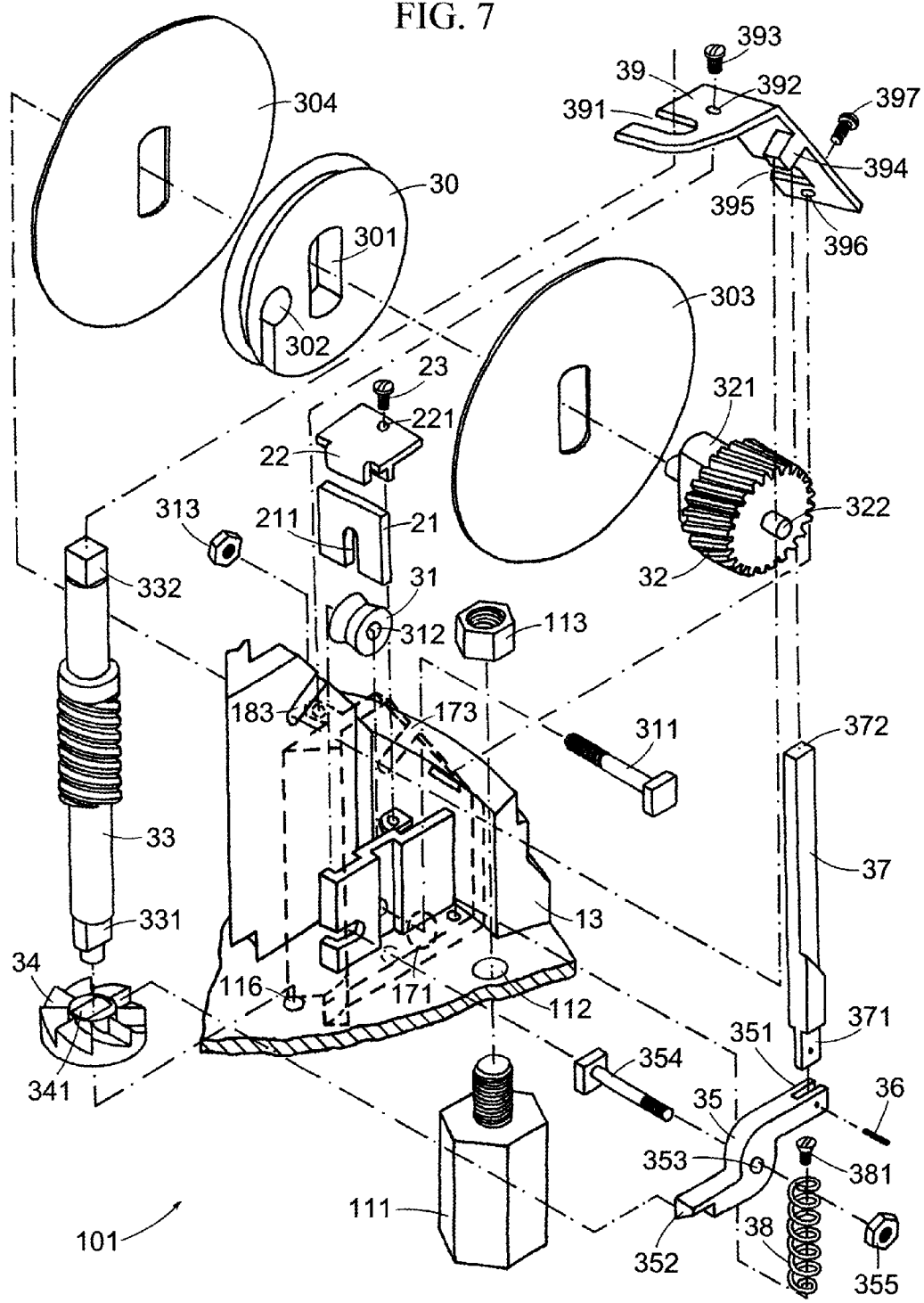
FIG. 7 illustrates an exploded view of the elements of a connection sector of the first embodiment center housing of the present device.

In the embodiment the center housing 10 may have a generally cylindrical shape and may be permanently mounted over the hub cover portion 71 of the wheel hub 70 to the hub bolts 72. As described below, for this purpose a plurality of adaptor bolts 111 may be used (see also FIG. 3; FIG. 6 and FIG. 7.) There are four adaptor bolts 111 in the embodiment but it should be understood that any suitable number may be also used. The mounted center housing 10 may be secured and located substantially within the rim 80 cavity of the vehicle wheel assembly 100. It should be noted that the center housing 10 of the device 1 may not increase the total vehicle width.

Figure 3:
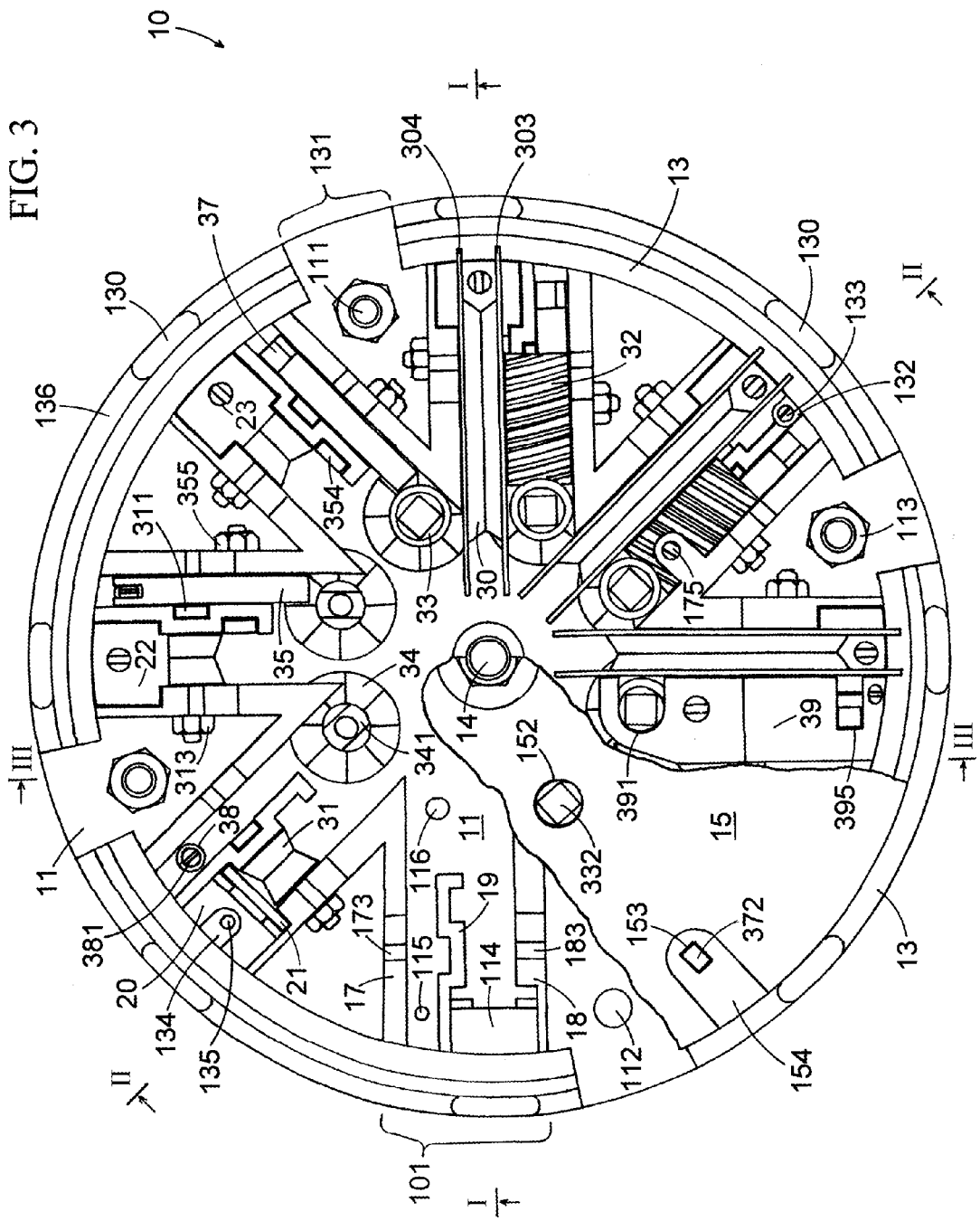
FIG. 3 illustrates a top plan partially exposed view of the first embodiment of the center housing of the present device.
Figure 4:
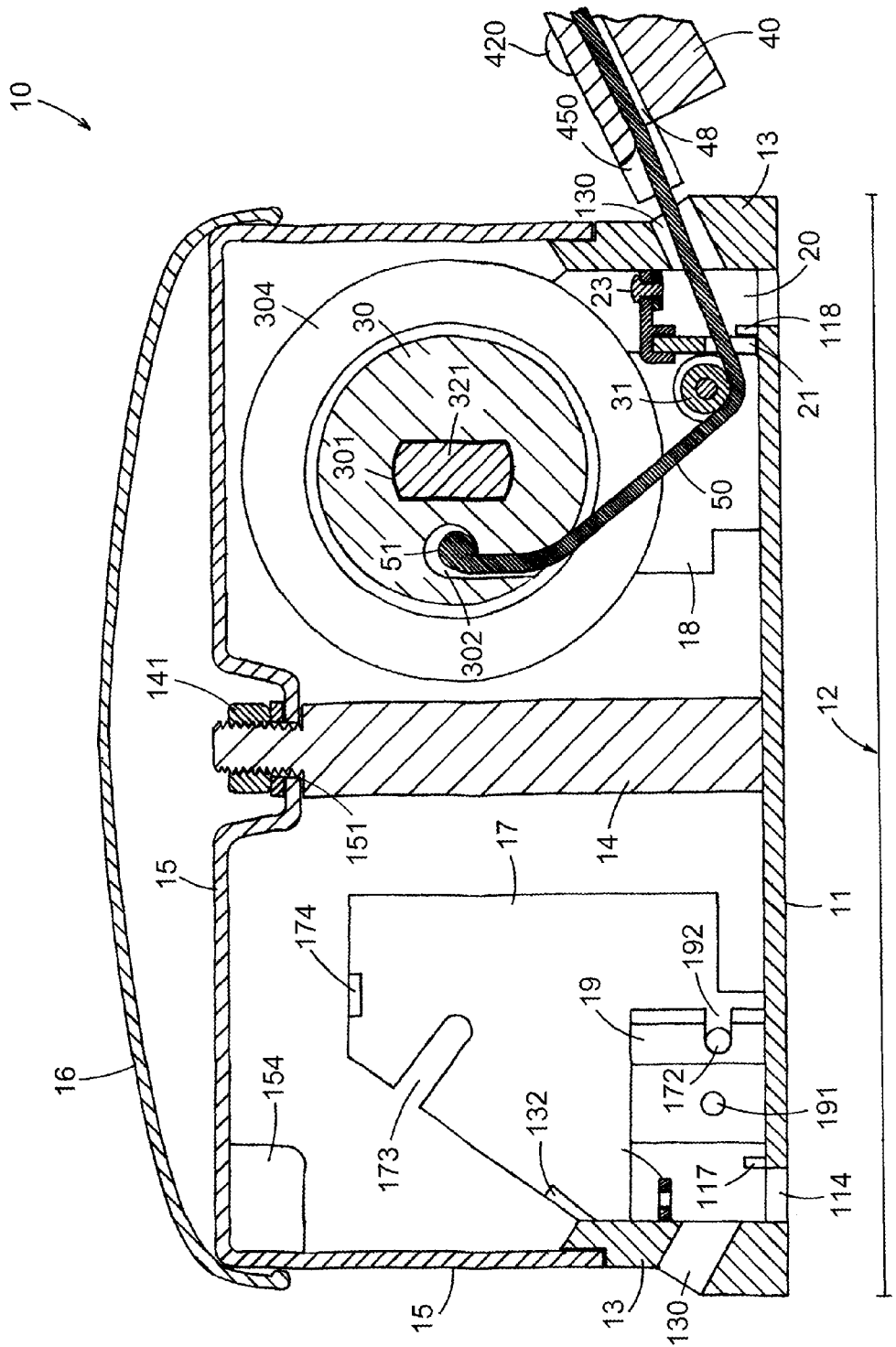
FIG. 4 illustrates a cross-sectional view taken by the line I-I of FIG. 3.

According to FIG. 3 and FIG. 4, the center housing 10 may generally have a foundation (bottom) 11; a sidewall 13; a center bolt 14; a center lug-nut 141; a top portion 15 and a detachable protection cap 16. The foundation 11 has an outer diameter 12, which may be equal to the diameter 74 (FIG. 2) of the wheel hub 70. The sidewall 13 may have a slantindicular (prone) board 136 and also plurality of relatively wide cuts 131 in order to provide more comfortable access to the adaptor bolts 111. The top portion 15 may have an opening 151 throughout its center and plurality of elongations 155 (FIG. 6). The top portion 15 may be secured to the center bolt 14 by the center lug-nut 141 as the elongations 155 being accepted by the corresponding cuts 131. Therefore, the center housing 10 may be securely closed and any non synchronous radially or axially movements between the foundation 11 and the top portion 15 may be prevented.

In the embodiment, the outer diameter 12 of the foundation 11, being equal (or smaller) to the diameter 74 of the wheel hub 70, may allow the demounting of the rim 80 without requiring the demounting of the center housing 10 of the device 1.

The center housing 10 may have a plurality of elements. For better understanding, in the embodiment, the elements may be informally sectioned to eight identical, relatively independent connection sectors 101, symmetrically placed around the center bolt 14 and the sidewall 13. It should be understood that any suitable plurality of the connection sectors 101 may be used to generally correspond to the plurality of the friction grips 40. Each of the connection sectors 101 may comprise a plurality of elements, identical to the other sectors 101 (see also FIG. 7). The plurality of elements within the connection sector 101 may provide the independent movement and the securing of each of the friction grips 40 as described below.

Referring now to FIG. 3, each connection sector 101 is being depicted gradually. As it appears on the figure, starting from the far left side of the drawing and inspected clockwise, the first connection sector 101 is shown empty and the last is being covered by the top portion 15. The gradualness also reveals the approximate order of montage of the elements.

The connection sector 101 may comprise a supporting left bracket 17; a supporting right bracket 18 and a supporting middle bracket 19 which may be in substantially parallel position to each other within the same connection sector 101. The left bracket 17 and the right bracket 18 of neighbor sectors 101 may connect (at an angle) to one another, so to strengthen the structure of the center housing 10. In the embodiment of the center housing 10, the foundation 11; the sidewall 13; the center bolt 14; the left bracket 17; the right bracket 18 and the middle bracket 19 may be one solid unit (metal casting).

A wheel 30 of the connection sector 101 may be placed between the right bracket 18 and the middle bracket 19 in radially perpendicular position with respect to the foundation 11 of the center housing 10. The perpendicular position may allow the placing of more wheels 30 (and therefore connection sectors 101), then would be able to fit using a parallel position.

Furthermore, the wheel 30 may have a generally rectangular aperture 301 throughout its center to fixedly accept a protrusion 321 of a toothed wheel 32 (see also FIG. 7). The toothed wheel 32 may be connected to a shaft 322. A protrusion 321 of the toothed wheel 32 may have the same rectangular shape as the rectangular shape of the aperture 301. The wheel 30 and the toothed wheel 32 may be secured within identical slits 173 and 183; respectively. More specifically, the wheel 30 and toothed wheel 32 may be secured in the slits 173 and 183 of the left bracket 17 and the right bracket 18 by the shaft 322. The wheel 30 and the toothed wheel 32 may rotate together.

Referring to FIG. 4, a wire 50 may have a first end 51 and a second end 52 (FIG. 2). The wire 50 may be generally coiled (and uncoiled) around the wheel 30. The first end 51 of the wire 50 may be temporarily secured within an indentation 302 of the wheel 30. The second end 52 may have a detachable loop (or hook) 53. Identical supporting side plates 303 and 304 of the wheel 30 (also FIG. 7) may provide additional support and proper coiling of the wire 50. A portion of the wire 50 may exit the connection sector 101 of the center housing 10 throughout a generally oval opening 130 of the slantindicular board 136 of the sidewall 13. A portion of the wire 50 may remain uncoiled around the wheel 30 and outside of the center housing 10. Further, a portion of the wire 50 may be secured within the friction grip 40. The wheel 30 may control the position of the friction grip 40 as described below.

Figure 5:
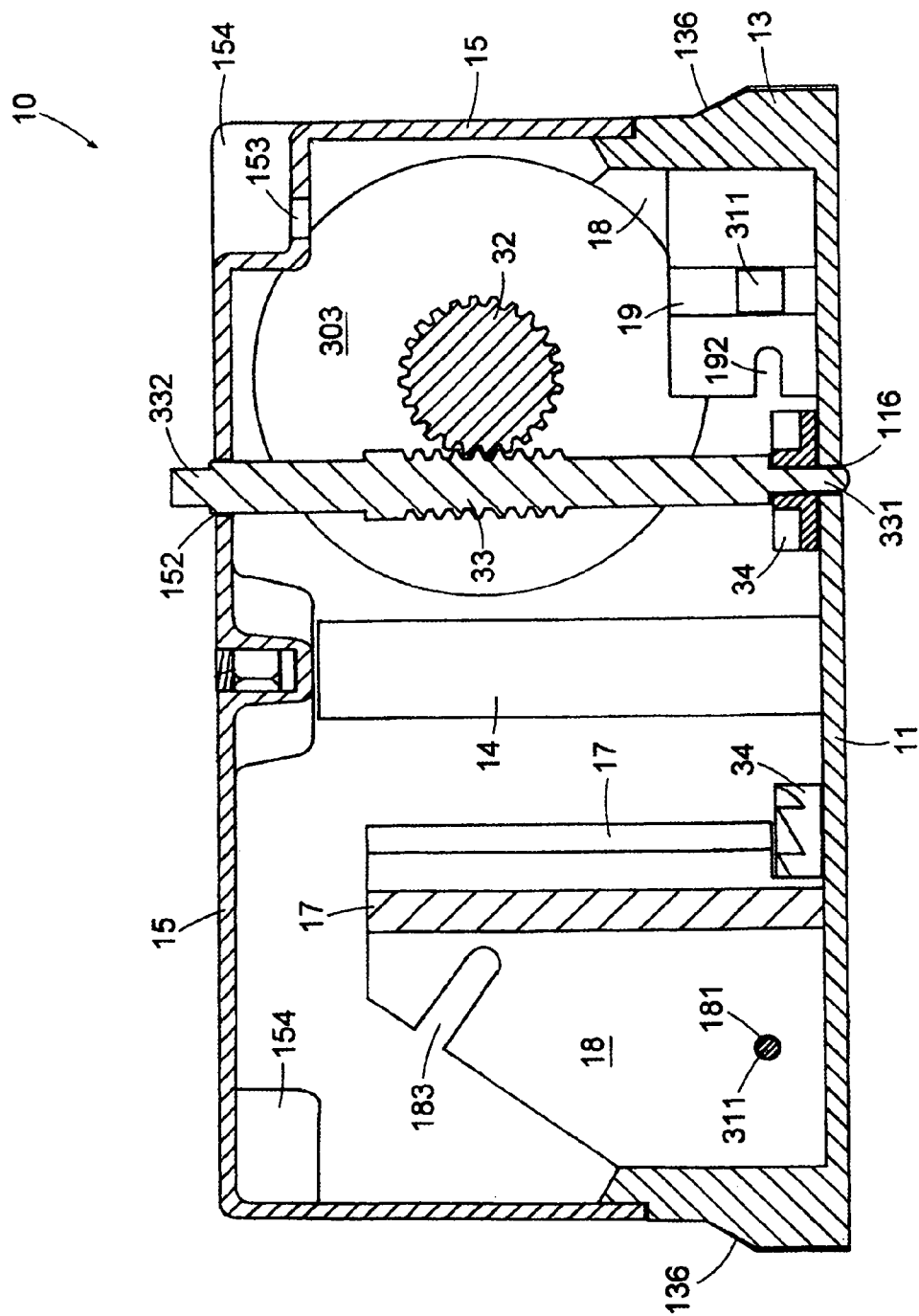
FIG. 5 illustrates a cross-sectional view taken by the line II-II of FIG. 3.

The connection sector 101 may also comprise a pivot spool 31 located generally below the wheel 30. The pivot spool 31 may have an aperture 312 (axially) and may be secured by a bolt 311 and a lug-nut 313. The bolt 311 may be accepted by corresponding apertures 191 and 181 respectively made within the middle bracket 19 and the right bracket 18 (FIG. 4 and FIG. 5). A proper sized opening 171 may be located on the left bracket 17 to provide access of the bolt 311 to the aperture 191 so the lug-nut 313 may remain outside of the connection sector 101 (FIG. 6 and FIG. 7). The pivot spool 31 may control the direction of the wire 50 and may share some the pressure of the wheel 30, caused by the stress force of the wire 50 when the wire 50 is tighten (explained below). The proper placing of the pivot spool 31 additionally supports the proper placing of the wheel 30, as the wheel 30 may remain forced generally toward the foundation 11 and contrary to the natural centrifugal forces.

As stated above, the wire 50 may be connected (coiled or uncoiled around the wheel 30) to the connection sector 101. The connection sector 101 may also have a worm shaft 33. The worm shaft 33 may have a generally rectangular top end 332 and a bottom end 331 (FIG. 5 and FIG. 7). The worm shaft 33 may contact and may control the toothed wheel 32. The top end 332 of the worm shaft 33 may exit the connection sector 101 throughout a circular aperture 152 on the top portion 15 of the center housing 10. Therefore, when the protection cap 16 is removed from the top portion 15 of the center housing 10, the top end 332 of the worm shaft 33 may remain exposed (and visible). The user may then apply a proper tightening tool, for example conventional lug-nut gauge over the top end 332 to rotate the worm shaft 33 and ultimately adjust the length of any portion of the wire 50 that may substantially remain outside of the center housing 10.

The connection sector 101 may have a side toothed wheel 34 having an aperture 341 throughout its center to lock the wire 50 to the desired position. The aperture 341 may have a shape corresponding roughly to the shape of the bottom end 331 of the worm shaft 33. By fixedly accepting the bottom end 331 within the aperture 341, the worm shaft 33 and the side toothed wheel 34 may rotate synchronously. The bottom end 331 of the worm shaft 33 may be also be partially accepted by an aperture 116 through the foundation 11 (FIG. 3; FIG. 7).

Furthermore, to prevent the reverse rotation of the worm shaft 33, a tapered end 352 of a center pivoted arm 35 may substantially remain inserted between any two of the teeth of the side toothed wheel 34 (FIG. 6 and FIG. 7). The center pivoted arm 35 may also have a second end 351 and a circular aperture 353. The center pivoted arm 35 may be located between the left bracket 17 and the middle bracket 19. The center pivoted arm 35 may be securely mounted by a bolt 354 and a nut 355. The bolt 354 may be accepted by a slit 192 and an aperture 172; respectively located on the middle bracket 19 and left bracket 17 (FIG. 4 and FIG. 5).

The tapered end 352 of the center pivoted arm 35 may pivot upward with a respect to the foundation 11. The connection sector 101 may also comprise a connecting pin 36; a second arm 37 and a compression spring 38 (FIG. 6; FIG. 7). More specifically, the second arm 37 may have a lower end 371 and upper end 372 and may be generally rectangular in shape. The second arm 37 may be located in a substantially perpendicular position with respect to the foundation 11 of the center housing 10. The connection pin 36 may secure together the second end 351 of the center pivoted arm 35 and the lower end 371 of the second arm 37. Similar to how the top end 332 of the worm shaft 33 exits the top portion 15 of the center housing 10, the upper end 372 of the second arm 37 may also extend throughout a generally rectangular opening 153 of the top portion 15 of the center housing 10 (FIG. 3; FIG. 5).

Remaining outside (above) the top portion 15, the upper end 372 of the second arm 37 may also be altered (depressed or released) by, for example, a finger. As a result, the generally rectangular opening 153 may be located within a generally finger shaped indentation 154 of the top portion 15 (also FIG. 5 and FIG. 6). The generally finger shaped indentation 154 may also provide additional protection against, for example, accidentally depressing the upper end 372 of the second arm 37 of the connection sector 101.

As stated above, a compression spring 38 may be located under the second arm 37 and may be in contact with the center pivoted arm 35. The compression spring 38 may be secured to a threaded aperture 115 of the foundation 11 by a flat headed bolt 381 (FIG. 3 and FIG. 7).

In an embodiment, the connection sector 101 may have a detachable cover bracket 39. As depicted on FIGS. 3; 6 and 7, the detachable cover bracket 39 may comprise a protrusion 394 located approximately within the middle of the bracket 39. The protrusion 394 may extend downward with respect to the foundation 11 of the central housing 10. The cover bracket 39 may also have a first opening 391 and a second opening 395. The first opening 391 and second opening 395 may be shaped to fit the shapes of the worm shaft 33 and second arm 37, as well the cover bracket 39. Further, the cover bracket 39 may have a first aperture 392 and a second aperture 396. The cover bracket 39 may be secured to a threaded aperture 175 of an ear 174 of the left bracket 17 and a threaded aperture 133 of an ear 132 of the sidewall 13; respectively by a screw-bolt 393 and screw-bolt 397.

To release more of the wire 50 from the wheel 30, the user may depress and hold the upper end 372 of the second arm 37 of the connection sector 101. As a result, the second end 351 may be forced downward therein forcing the tapered end 352 of the center pivoted arm 35 upward which releases (unlocks) the side toothed wheel 34. At the same time, the compression spring 38 may be also compressed. Therefore, according to the above description, the free but yet synchronous rotation of the side toothed wheel 34; the worm shaft 33; the toothed wheel 32 and the wheel 30 may be provided by pulling the wire 50 toward the periphery of the vehicle wheel assembly 100.

In the embodiment, to take in more of the wire 50, the user may release the top end 372 of the second arm 37. The tension force of the compression spring 38 may force back upward the second arm 37 along with the second end 351 of the center pivoted arm 35. Therefore, the tapered end 352 of the center pivoted arm 35 may be pivoted back downward to engage between any two teeth of the side toothed wheel 34. Further the free synchronous rotation of the side toothed wheel 34; the worm shaft 33; the toothed wheel 32 and the wheel 30 may be no longer provided. By applying a proper tightening gauge tool around the exposed top end 332 of the worm shaft 33, the user may then start rotating the side toothed wheel 34 to ultimately wind more of the wire 50 around the wheel 30 of the connection sector 101 to the desired position.

Because the device 1 is designed to be used under winter weather conditions, debris, rocks, snow, water, ice or any other material may become attached to the wires 50 of the central housing 10. To prevent the entering of any foreign objects into the connection sectors 101 of the central housing 10, the connection sector 101 may comprise a self-cleaning chamber 20 (FIG. 3; FIG. 4). The self-cleaning chamber 20 may be located between the right bracket 18 and the middle bracket 19 and next to the foundation 11 and the sidewall 13 of the center housing 10. The self-cleaning chamber 20 may also comprise, for example, a rubber cleaner 21 and a holder bracket 22. The holder bracket 22 may secure in the rubber cleaner 21 in a desired location.

The holder bracket 22 may be secured by a screw-bolt 23 placed into an aperture 221 of the holder bracket 22 (also FIG. 7). The screw-bolt 23 may be further accepted by a threaded aperture 135 of an ear 134 of the sidewall 13. For additional security, the rubber cleaner 21 may be in close contact to the pivot spool 31 and two identical protrusions 117 and 118 of the foundation 11. Furthermore, when the wire 50 passes through the generally oval opening 130 of the sidewall 13 to be ultimately recoiled back around the wheel 30, the wire 50 may also pass though a slit 211 of the rubber cleaner 21 (FIG. 7). In the embodiment, the rubber cleaner 21 may be made from rubber, but any material, having the suitable properties, may be also used. Therefore, the foreign objects may be stripped off the wire 50 by the rubber cleaner 21 and may be expelled out of the self-cleaning chamber 20 of the connection sector 101 by an exit opening 114, made throughout the foundation 11. In the embodiment, the exit opening 114 may have a generally rectangular shape (FIG. 3; FIG. 4). Generally, within the first couple hundred feet during driving, any foreign objects left cumulated within the self-cleaning chamber 20 of the connection sector 101 may be additionally ejected out of the central housing 10 by the centripetal forces, caused by the rotation of the vehicle wheel assembly 100. Therefore, the center housing 10 of the device 1 may be clean and ready for next use.

Referring now to the FIG. 1 and FIG. 2, the device 1 may have a plurality of friction grips 40 which independently move from an inactive first position, secured to the sidewall 13 (also FIG. 4) of the center housing 10, to the active second position, secured over the tire 90 of the vehicle wheel assembly 100 as described below. FIG. 1 illustrates eight friction grips 40 being used; however it should be understood that any suitable number of friction grips 40 may be used depending on the type and size of the tire 90 and/or the desired function of the device 1. The friction grips 40 may be generally made from metal, such as steel and may have rubber or plastic components. In the embodiment, the friction grips 40 are single solid units. Any random number of the friction grips 40 may be engaged separately, upon the driver's decision.

When secured to the sidewall 13 of the center housing 10 in the inactive first position, the friction grips 40 are approximately at a forty-five degree angle with respect to the ground. When secured in the active second position over the tire thread 91, the friction grips 40 may rotate with the tire 90 in a substantially parallel manner with respect to the ground, more specifically described below.

Referring now to FIGS. 8 and 9, the friction grip 40 of the device 1 may have a top 41, a bottom 42, a front 43, a back 44, a first side 45, a second side 46 and a length 49. The top 41 of the friction grip 40 may be tapered 47 outward so as to better grip the surface of the road. Further, the interior of the friction grip 40 (the underside of the tapered portion 47) may be used to cover, store and protect a portion of the wire 50 of the connection sector 101 of the central housing 10. In the embodiment, the friction grip 40 comprise a channel 48 (FIG. 4), having an open end 481. The channel 48 may be slightly greater in width than the width of the wire 50 of the connection sector 101. The wire 50 may pass through the open ends 481 and may pass through the channel 48 which may run along the inside (the entire length) of the interior of the friction grip 40 (the underside of the tapered portion 47). Therefore, a portion of the wire 50 may remain within the inside of the friction grip 40 and the friction grip 40 may remain secured (constrained) around the wire 50 and between the sidewall 13 of the center housing 10 and the loop (hook) 53 of the wire 50. Furthermore, the entire friction grip 40 may rotate around the wire 50 while the wire 50 is not being tightened. As described below, allowing the friction grip 40 to rotate orientation around the wire 50 may be important in the storage of the friction grip 40 to the sidewall 13 of the center housing 10 within the cavity of the rim 80 while the device 1 is not being used. It should be noted also, that when stored the friction grips 40 are located substantially within the rim 80 cavity and do not increase the total vehicle width.

A generally oval protrusion 450 may be located on the first side 45 of the friction grip 40. The generally oval protrusion 450 may be partially secured within the sidewall 13 of the center housing 10 while the device 1 is stored in the inactive first position. More specifically, the shape of the generally oval protrusion 450 may correspond to the shape of the above described generally oval opening 130 of the slantindicular board 136 of the sidewall 13 of the center housing 10. Further, a substantial portion of the wire 50 may be retracted and coiled around the wheel 30 of the connection sector 101. Therefore, the generally oval protrusion 450 may be fixedly inserted (accepted) into the generally oval opening 130 so that the friction grip 40 may be secured in place (FIG. 4). When inserted, the shape of the generally oval protrusion 450 may prevent unwanted rotation of the friction grip 40 with respect to the connection sector 101; the oval shape also may be any other, different from circle shape.

The loop 53 of the second end 52 of the wire 50 may be used to further hold the friction grip 40 in an inactive first position. More specifically, the loop 53 of the second end 52 of the wire 50 may force the friction grip 40 inward toward the connection sector 101 while the wire 50 is being tightened (and locked) around the wheel 30. The slantindicular board 136 of the sidewall 13 may allow the friction grips 40 to be secured to the center housing 10 on an angle. More especially, the angle may allow the length 49 of the friction grip 40 to be generally greater than a distance 800 between a sidewall 81 of the rim 80 and the center housing 10 (FIG. 2).

In the embodiment, the slantindicular board 136 of the sidewall 13 may also be used to offset (compensate) the width of the wires 50 within the diameter 12 of the center housing 10 whenever the rim 80 needs to be removed away from the vehicle wheel assembly 100. For this purpose all the wires 50 may be loosen and bound together generally above the top portion 15 of the center housing 10 of the device 1. Therefore, it may not be necessary to remove the center housing 10.

Referring to FIGS. 8 and 9, the second side 46 of the friction grips 40 may also have an elongated lip portion 460 which extends downward, away from the top 41 of the friction grip 40. More specifically, the second side 46 of the friction grip 40 may extend downward at an angle approximately equal to an angle or curve of the surface (portion, near the periphery) of the sidewall 81 of the rim 80 of the vehicle wheel assembly 100. The elongated lip portion 460 may have a length 461. The second side 46 of the friction grip 40 may also have a slit 462 which may extend a portion of the length 49 of the friction grip 40 from the edge of the second side 46 toward the middle of the friction grip 40. The slit 462 may further extend downward and across the elongated lip portion 460 of the friction grip 40. When in the inactive first position, the elongated lip portion 460 and the slit 462 may be located (rest) near the sidewall 81 of the rim 80, and it should be noted that a gap preferably exists between the elongated lip portion 460 and the external sidewall 81 of the rim 80.

Accordingly to FIG. 2, while in first inactive position, there may be no contact between the friction grip 40 and the rim 80. To change from the inactive first position to the active second position, the user may slightly move the friction grip 40 outward away from the center of the rim 80 and toward the sidewall 81 of the rim 80. More specifically, the friction grip 40 must be moved outward from the center housing 10 so that the protrusion 450 of the first side 45 of the friction grip 40 disengages and is removed from the generally oval opening 130 of the connection sector 101. Respectively, the shape of the elongated lip portion 460 may be substantially similar (to match) to the shape of the sidewall 81 of the rim 80. It should be noted that for safety purpose, when in inactive first position the top 41 (tapered portion 47) of the friction grip 40 faces inward, toward the rim 80 cavity and the bottom 42 face outward, away the vehicle wheel assembly 100. As shown in FIG. 2, the friction grips 40 extend both axially and radially outwardly between the center housing 10 and the sidewall 81 of the rim 80

Furthermore, the user may rotate the friction grip 40 approximately one hundred and eighty degrees and place it over the tire thread 91. Accordingly, a substantial portion of the wire 50 is pulled away of the connection sector 101 and the loop (hook) 53 of the second end 52 may be secured to a hook 63 (FIGS. 1; 2 and 10). The wire 50 (and the friction grip 40) may be further tightened as described above. The wire 50 may be in direct contact with a tire sidewalls 93; the portions of the tire 90 which typically does not contact the surface of the road. During use of the device 1, the length of the exposed wire 50 at the first side 45 of the friction grip 40 may be greater than the exposed wire 50 at the second end 46 of the friction grip 40.

While the friction grip 40 is secured over the tire thread 91, the elongated lip portion 460 and the slit 462 of the second side 46 face toward the vehicle. More especially, the elongated lip portion 460 may be placed over (and substantially match) an inner edge 92 of the tire 90; the edge, between the tire thread 91 and the inner tire sidewall 93 (FIG. 2). The slit 462 may extend far enough from the edge of the second side 46 of the friction grip 40 and toward the middle of the friction grip 40 so that the wire 50 is protected from direct contact with the ground. A portion of the wire 50 may be in a parallel position with respect to the slit 462 such that a portion of the wire 50 may pass through the slit 462. Allowing the wire 50 to directly contact the tire sidewalls 93 may allow for increased firmness and increased security of the wire 50 and the friction grip 40 while the device 1 in the active second position. In addition, the generally oval protrusion 450 of the first side 45 may have an indentation 451 for which the wire 50 passes through.

A series of protrusions 420 may be present on the bottom 42 of the friction grip 40. FIG. 9 illustrates six protrusions 420 present on the bottom 42 of the friction grip 40; however any suitable number of protrusions 420 may be used. The protrusions 420 may directly contact the tire 90 and may help prevent slippage of the friction grips 40 from the tires 90 during use.

It is important that the friction grips 40 and the wire 50 be durable enough so as to withstand the forces associated with lengthy high speed travel across roads of various conditions. The adjustable length of the wire 50 allows the device 1 to be suitable for use with tires 90 and rims 80 of various types and sizes. As shown, the order and arrangement of the friction grips 40 around the rim 80 may help the balancing of the tire 90 and may reduce the excessive and uneven wearing of the tire thread 91.

Each of the friction grips 40 may function completely independent of each other. Therefore, if friction grip 40 was damaged or broken, the remaining friction grips 40 may be secured around the tire 90 and used completely independently from the damaged friction grip 40. Further, the user may elect to use less than all the friction grips 40 (even though all may properly work) so as to provide just enough traction as needed for the tire 90. Using less than all of the friction grips 40 may save the driver installation time. Further, because of the independent nature of the friction grips 40, a driver need not replace the entire device 1 if one or more friction grips 40 are damaged or otherwise broken. Further, any broken friction grip 40 may be easily replaced "on spot" with a piece of conventional chain with various length and/or width.

Also a benefit of the present device 1 is that a user may accurately predict when the device 1 may fail prior to the device 1 actually failing. More specifically, the wire 50 may be comprised of a plurality of thinner wires wrapped around each other. Inspection of the wires 50 may easy reveal some of the thinner wires being worn or cut. The user may then take appropriate action prior to the device 1 failing while driving. In comparison, conventional devices using chains generally break or fail without warning.

Accordingly to FIG. 1 and FIG. 2, the device 1 may also comprise a securing disk 60. The securing disk 60 may be generally circular and preferably made of a strong material such as metal. The securing disk 60 may generally provide contact (pivot) points, for example, such as hooks or openings to which the second end 52 of the wire 50 may be secured.

Figure 10:
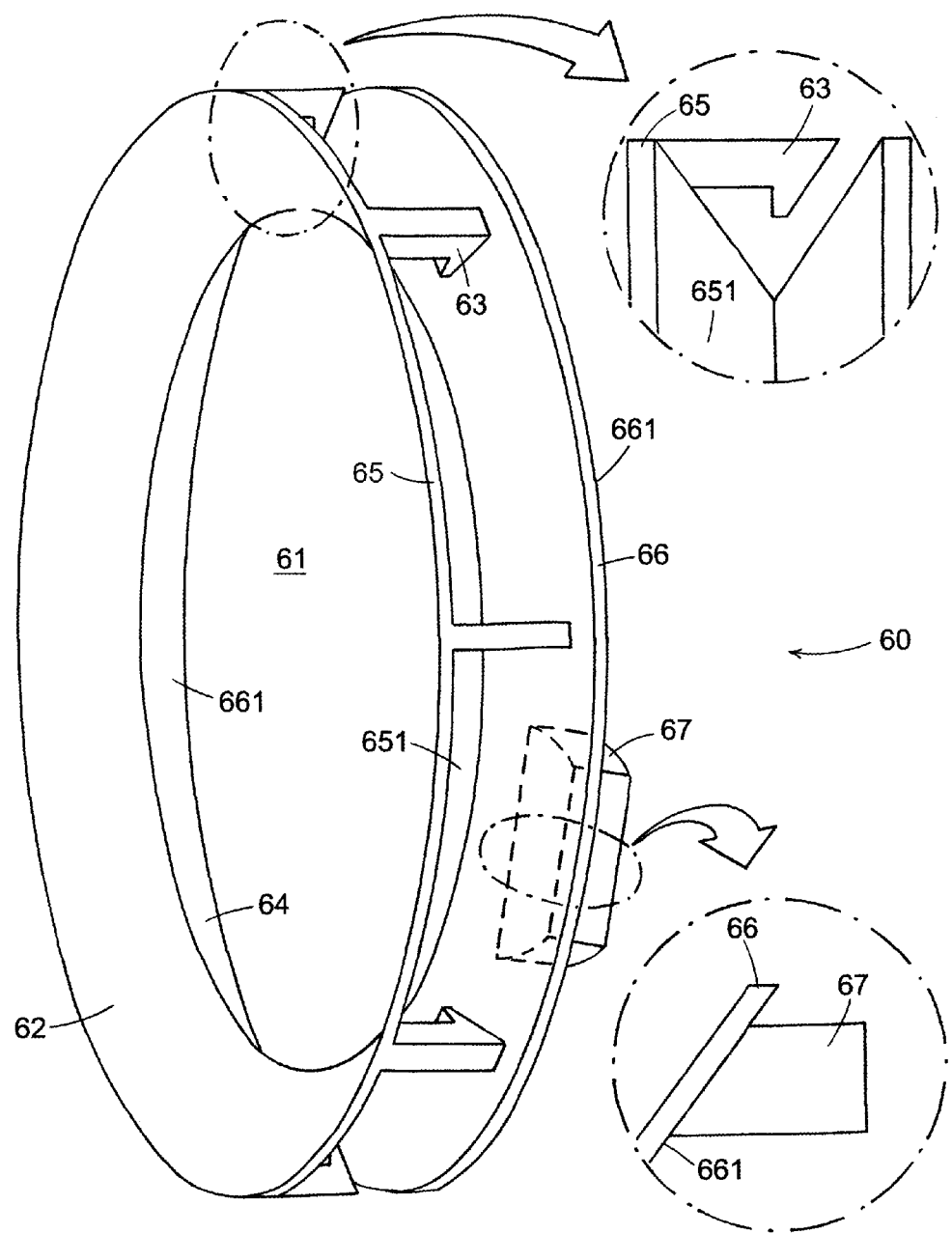
FIG. 10 illustrates a perspective view of the securing disk of the present device.

Referring to FIG. 10, the securing disk 60 may have a center opening 61. The center opening 61 may be wide enough to closely accept the wheel hub 70 (or vehicle axle). More specifically, the securing disk 60 may be placed and secured to an inner side 82 of the rim 80.

In the embodiment, the securing disk 60 may be used on a vehicle having a dual wheel assembly 100. In the dual wheel assembly, the securing disk 60 is placed and secured between the two rims 80. The center opening 61 may be placed where the surface of the two rims 80 typically contact to each other. More specifically, the securing disk 60 may closely surround and contact to the inner sides 82 of the rims 80 without increasing the distance between the rims 80. As a result, any unwanted radial movement of the securing disk 60 may be prevented. While placed on the rim 80, the securing disk 60 may not make a contact to the tire 90 of the rim 80 and the ground surface.

The securing disk 60 may have a first side 62 and a second side 64. While secured on the rim 80, the first side 62 of the securing disk 60 may face outward (away from the vehicle) and the second side 64 may face inward (toward the center of the vehicle). In an embodiment, the securing disk 60 may have a first plate 65 and a second plate 66. It should be noted, that a single plate embodiment may be used in the device 1.

As stated above, the securing disk 60 may have a plurality of hooks 63. Typically, the number of hooks 63 on the securing disk 60 correspond to the number of friction grips 40 such that each wire 50 of each friction grip 40 has a hook 63 to be secured on. The hooks 63 may be secured to a back side 651 of the first plate 65 of the securing disk 60.

The second plate 66 may also have a back side 661. Located anywhere on the back side 661 of the second plate 66 (or first plate 65 if only one plate is used) may be an extended protrusion 67. The extended protrusion 67 may be fixedly inserted into anyone of the typical openings 83 (FIG. 1 and FIG. 2) of the rim 80 such that the securing disk 60 may not rotate (axially) independently from the rim 80; but will rotate in unison with the vehicle wheel assembly 100 (dual). When the device 1 is in use (active second position), the loop 53 of second end 52 of the wire 50 may be temporarily secured to the hook 63 of the securing disk 60.

It should be noted that various embodiments of a securing disk 60 are possible without departing from its above stated purpose. The embodiments may vary depending, for example, on the different sizes and shapes of the rims 80 or whether the rims 80 are part of a single or dual vehicle wheel assembly 100. In some rims 80, the usage of the securing disk 60 may not necessary. For example, if the rim 80 has enough openings 83, the hooks 53 of the wires 50 may be secured directly to the openings 83 or any other suitable (synchronously rotated) elements of the vehicle wheel assembly 100.

The device 1 may be installed and engaged (or disengaged) when the vehicle is at a secured stop and the brakes are applied. For safety reasons, the device 1 is intended to be initially installed by persons having an appropriate training or background. Preferably, the person changing the tire 90 will also initially install the device 1. To engage the device 1, the user only needs a proper tightening tool (for example a conventional lug-nut gauge).

For the initial installation of the device 1, the rim 80 is removed from the vehicle wheel assembly 100. The securing disk 60 then is then placed around the wheel hub 70 (or axle) so that when the rim 80 is mounted back, the securing disk 60 remains fixedly secured to the inner side 82 of the rim 80; or between the rims 80 (if dual wheel assembly is used). The lug-nuts 73 of the wheel hub 70 are then substituted by the adaptor-bolts 111; or the adaptor-bolts 111 may be secured over the lug-nuts 73 (if enough thread on the hub bolts 72). Next, the center housing 10 is secured to the adaptor-bolts 111 by lug-nuts 113. The adaptor bolts 111 are partially accepted by apertures 112. As above described, the loops (hooks) 53 of the wires 50, are temporary detached, while the friction grips 40 are inserted around the second end 52 (temporary open) of the wires 50. Then, the friction grips 40 are positioned in the inactive first position and the device 1 is ready for use.

To engage a friction grip 40 into the active second position, the user first removes the protector cap 16 of the center housing 10 and depresses and holds the upper end 372 of the second arm 37. The rotation of the wheel 30 of the corresponding connection sector 101 is allowed and the wire 50 may then be uncoiled around the wheel 30. With the other hand, the user may pull the friction grip 40 away from the connection sector 101 and across the tire 90. Accordingly, the wire 50 may be uncoiled and pulled along. The user then secures the loop (hook) 53 of the second end 52 of the wire 50 to the corresponding hook 63 of the securing disk 60 while still lightly holding and adjusting the friction grip 40 over the tire thread 91. Further, the user releases the upper end 372 of the second arm 37. As a result, the second arm 37 is pushed back up by the compression spring 38 to ultimately prevent the free (unwanted) rotation of the wheel 30. Finally, the worm shaft 33 is rotated by applying a proper tool around its top end 332 to ultimately take in all the slack of the wire 50 (being retracted around the wheel 30), until it is tighten. The friction grip 40 is then firmly pressed and secured in place. The tensile strength of the tire 90 and the plurality of the protrusions 420 are stressed against the tire thread 91, without damaging it, providing additional security. The engaging process is then complete and the vehicle is ready to proceed on slippery or icy roads.

To be disengaged a friction grip 40 back into the inactive first position, the process is reversed.

Once installed, the device 1 need not be removed completely from the vehicle wheel assembly 100, even in the off season (such as summer). Optimally, it is only completely removed from the vehicle wheel assembly 100 when there is a major problem with the vehicle wheel assembly 100 or the vehicle in general.

Figure 11:
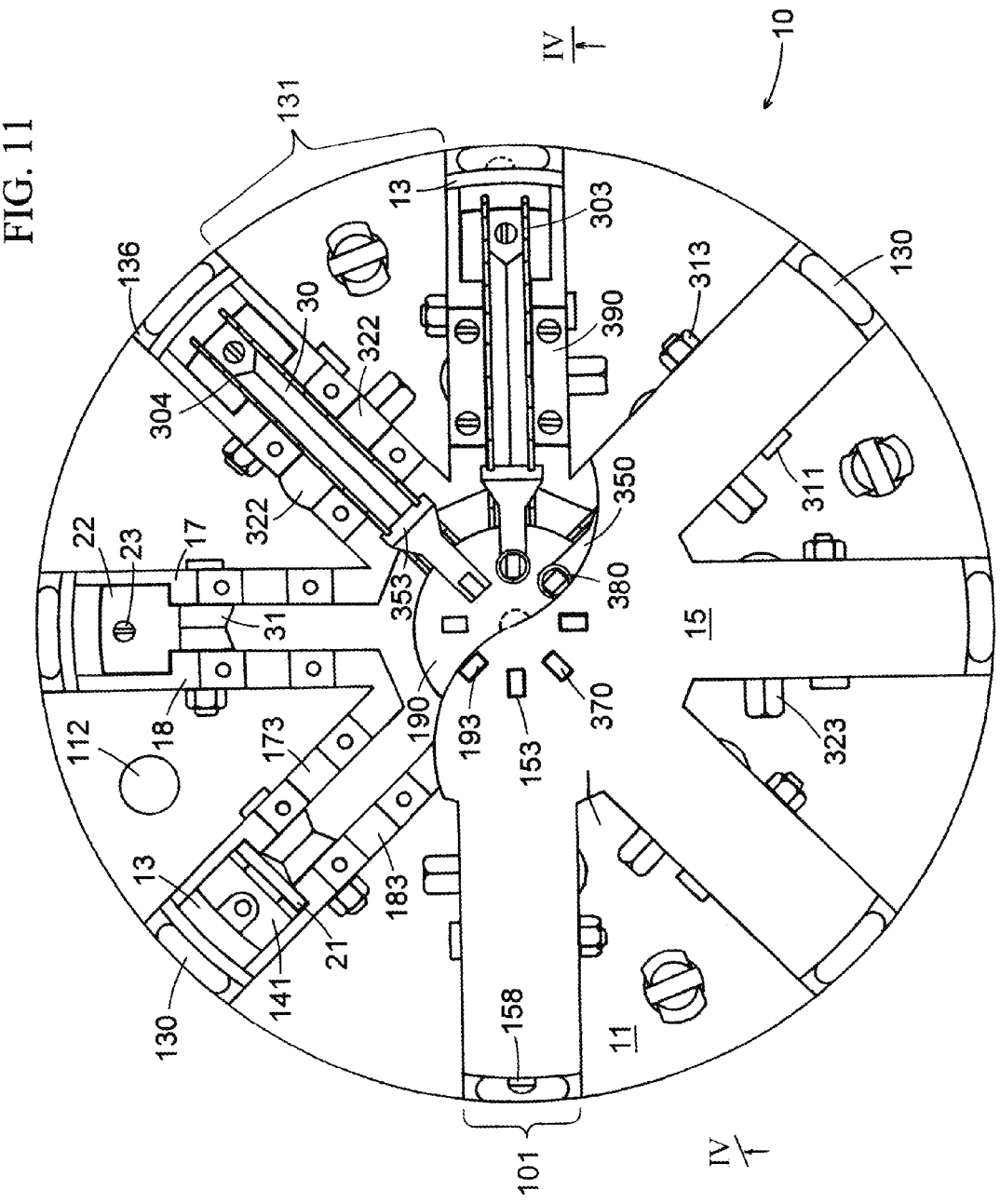
FIG. 11 illustrates a top plan view of the center housing, according to the second embodiment of the present device.
Figure 12:
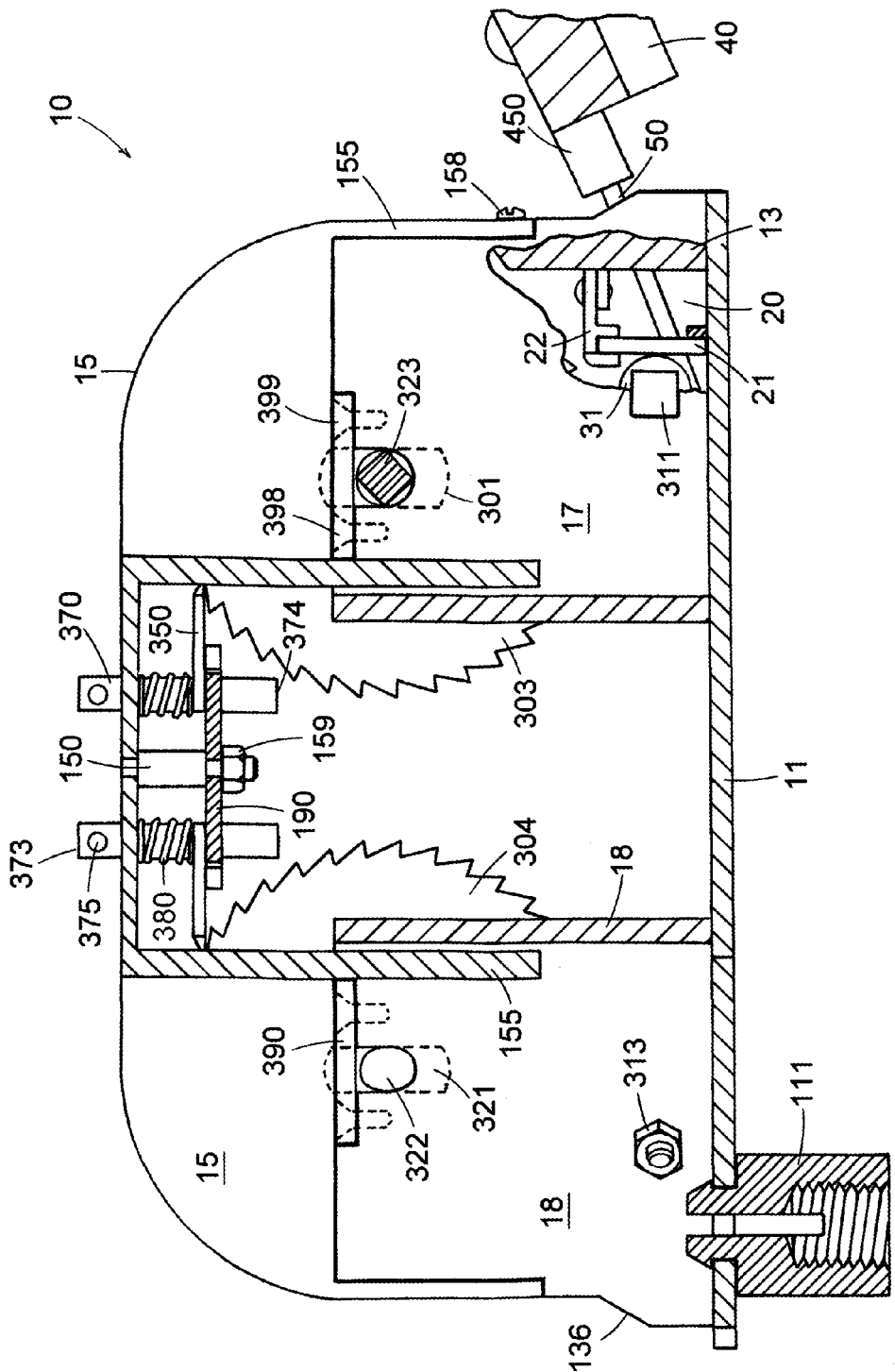
FIG. 12 illustrates a cross-sectional view taken by the line IV-IV of FIG. 11.

FIG. 11 and FIG. 12 illustrate the second embodiment center housing 10. As depicted, the second embodiment center housing 10 is more simplified than the first one (FIG. 3). Referring to FIG. 11 and FIG. 12, the top portion 15 may be modified to cover only the plurality of the connection sectors 101 and therefore, a substantial surface of the foundation 11 may remain exposed. The top portion 15 may be generally star shaped (eight edged) and may be secured to the sidewall 13 by a plurality of screw-bolts 158. For additional security, a plurality of elongations 155 (additional) may closely cover the area (outside), where the left brackets 17 and the right brackets 18 of a neighbor sectors 101 concluding contact to an angle. It should also be noted, that the middle bracket 19 may not present in the second embodiment.

Two identical supporting side plates 303 and 304 of the wheel 30 may have a plurality of teeth along their periphery. The wheel 30 may contact the protrusion 321; therein eliminating the need of the toothed wheel 32. The shaft 322 may remain in place and may be placed within the slits 173 and 183 and secured by two identical cover brackets 390. The two identical cover brackets 390 may be respectively secured within the left bracket 17 and the right bracket 18 by a first screw bolt 398 and a second screw bolt 399.

In addition, to provide the coiling of the wire 50 around the wheel 30, a generally rectangular protrusion 323 (similar to the generally rectangular top end 332 of the worm shaft 33), may be added axially to the shaft 322. The generally rectangular protrusion 323 may remain exposed and outside the left bracket 17 of the connection sector 101. Furthermore, to retract the wire 50, a proper tightening tool may be applied over generally rectangular protrusion 323 and the tool may be rotated to retract the wire 50. The relatively wide cuts 131 of the sidewall 13 may allow for easy access for the tool to reach the generally rectangular protrusion 323.

The process of preventing the free, unwanted rotation of the wheels 30 (by the fixation of the wires 50) to the desired position is described below. According to the second embodiment of the center housing 10, located on the center of the top portion 15, may be a bolt 150 (FIG. 12). The bolt 150 may extend downward in a perpendicular position with respect to the foundation 11. The generally rectangular openings 153 of the top portion 15 may be symmetrically located around and near the bolt 150. Furthermore, a middle plate 190, having a plurality of generally rectangular apertures 193, may be fixedly secured to the bolt 150 by a lug-nut 159. The middle plate 190 may have, for example, a generally circular shape and may be in parallel position with respect to the top portion 15. Further, the middle plate 190 may be located close to the top portion 15 and generally within the middle of the center housing 10. It should be noted that the middle plate 190 does not contact the wheels 30 of the connection sectors 101.

A plurality of control arms 370 may have upper ends 373 and lower ends 374. The upper ends 373 and the lower ends 374 may have a proper shape to be fixedly accepted respectively by the generally rectangular openings 153 of the top portion 15, and the generally rectangular apertures 193 of the middle plate 190. It should be noted that the control arms 370 may be inserted from the inside-out prior the middle plate 190, as the upper ends 373 may remain exposed above the center housing 10.

In order to locked the wheels 30 (and the wires 50) into the desired position, each of the control arms 370 may have a clutch arm 350 permanently secured generally in the middle of the control arms 370, in a perpendicular position. Each of the clutch arms 350 may correspond to each of the wheels 30 and each clutch arm 350 may be located generally above, and in parallel position with respect to the wheels 30. Respectively, a tapered ends 353 of the clutch arms 350 may contact and substantially remain engaged between any two of the teeth of the identical supporting side plates 303 and 304.

According to the above description, to unlock a wheel 30, the user may pull out the upper end 373 of the control arm 370. Suitable for this purpose, the upper end 373 may have an aperture 375. To lock in position the wire 50, the user may release the upper end 373 and the control arm 370 may be pushed back by a compression spring 380. The compression spring 380 may be secured around the control arm 370 and may be constantly forced between the top portion 15 and the clutch arm 350 respectively to hold the tapered end 353 against the teeth of the identical supporting side plates 303 and 304 of the wheel 30.

In the embodiment, each set of clutch arms 350, control arms 370 and compression springs 380 are being held and secured by one common (collective) middle plate 190, but yet act completely independent to one another. Therefore each set should be considered as a part of the corresponding connection sectors 101 of the center housing 10 of the device 1.

Figure 13:
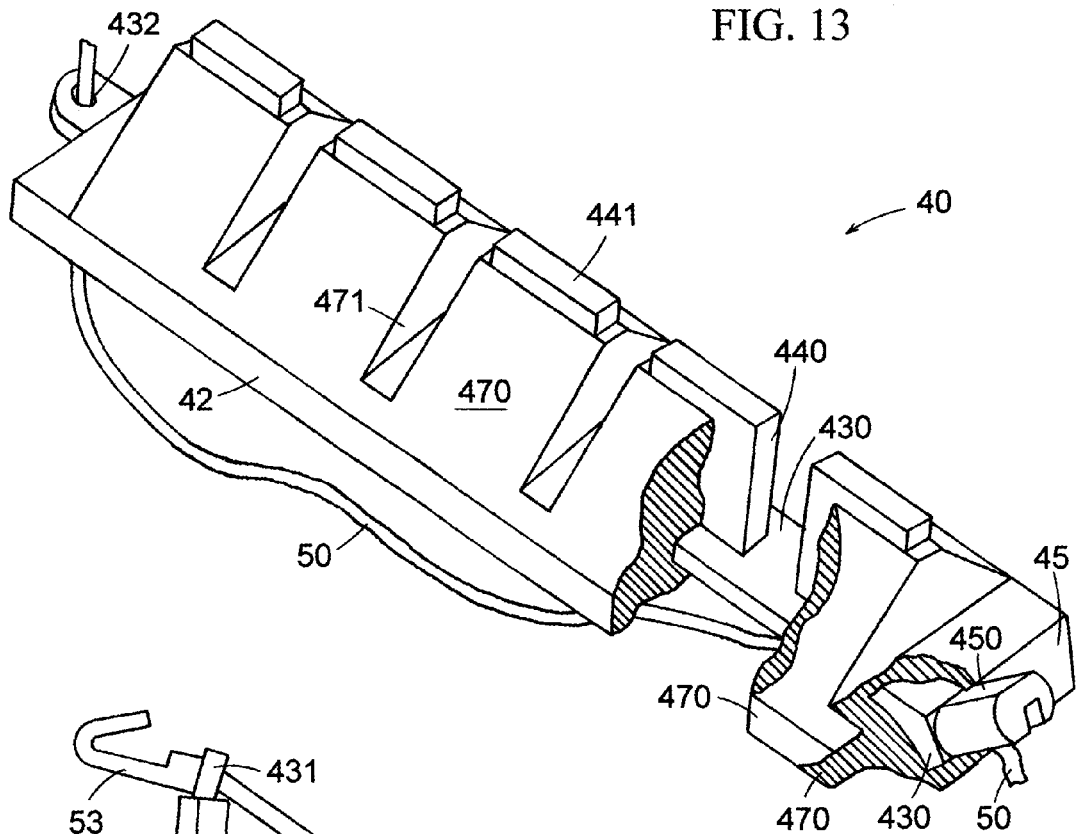
FIG. 13 is a perspective view of the top side of the second embodiment of the friction grip.
Figure 14:
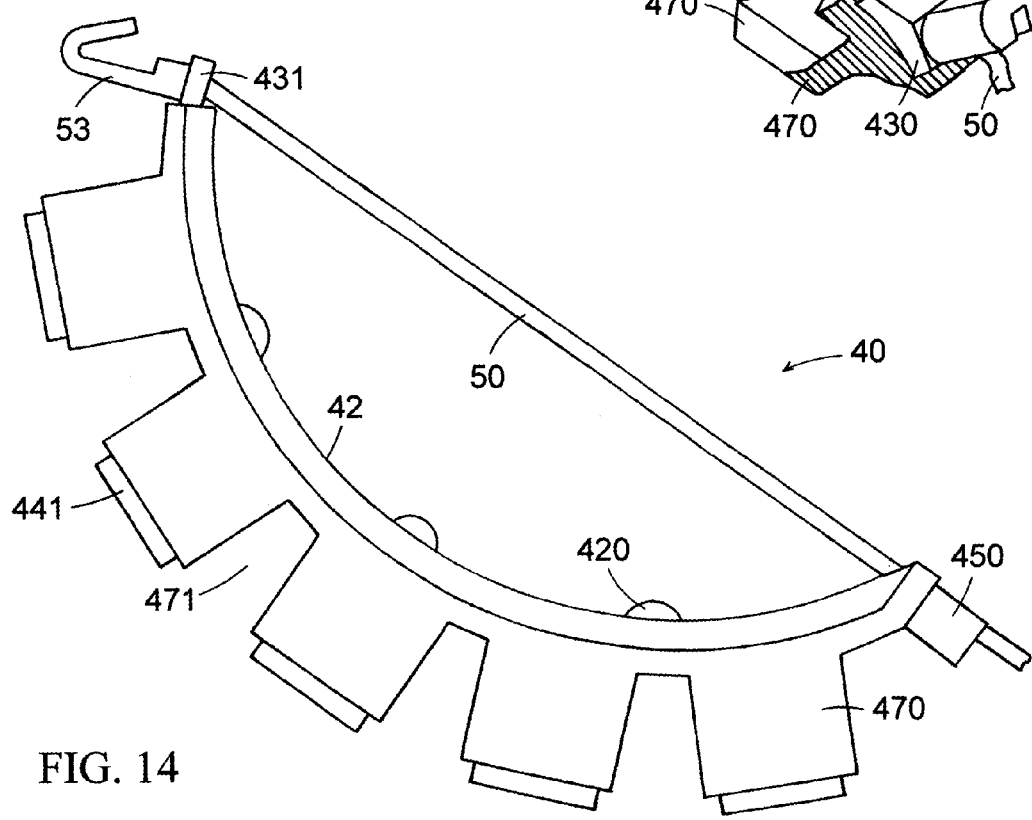
FIG. 14 is a side view of the second embodiment of the friction grip.

FIG. 13 and FIG. 14 illustrate a second embodiment of the friction grip 40. According to FIG. 13, the friction grip 40 may generally comprise a flexible core surface 430 and flexible covering 470. The flexible covering 470 may be generally made from a rubber molding or likewise material. The flexible core surface 430 may be positioned approximately within the middle and along the entire length of the friction grip 40. The flexible core surface 430 may be made from resilient but yet durable material, for example steel, and may have a plurality of knobs 440. The knobs 440 may have exposed end 441, which face and contact the ground surface and may provide additional friction. The knobs 440 also may be made from durable material (such as metal), and may be symmetrically placed and permanently secured to the flexible core surface 430. The generally oval protrusion 450 of the first side 45, may be secured directly and permanently to the flexible core surface 430, as the last may also comprise a elongated portion 431, extending from the second side 46 of the friction grip 40.

In the embodiment, the flexible core surface 430 and the knobs 440 may be substantially surrounded by the flexible covering 470, except for at the exposed ends 441 of the knobs 440. The flexible covering 470 may provide additional strength, balance and may increase the life expectancy of the friction grip 40. The flexible covering 470 may comprise a plurality of approximately equal sized slots 471 located between each two of the knobs 440. The slots 471 may provide additional flexibility ("weak spots").

Unlike the previous embodiment, the wire 50 of the connection sector 101, may pass throughout the generally oval protrusion 450 of the first side 45 and an aperture 432 of the elongated portion 431, and may remain generally exposed under the bottom 42 of the friction grip 40.

According to the above description the friction grip 40 may be substantially bendable so when forced, the friction grip 40 may generally bent to a curve (bow).

In an embodiment, the center housing 10 may be used independently of the friction grips 40. More specifically, traditional tire chains (or pieces of chains), can be attached to the hooks 53 of the second end 52 of the wires 50.

FIG. 14 illustrates an alternative embodiment shape the friction grip 40 may have when secured to the inactive first position. The wire 50 may be tighten around the wheel 30 of the connection sector 101, causing the friction grip 40 to bent inward, toward the rim 80 of the vehicle wheel assembly 100. Being stored this way, the friction grip 40 may be substantially longer than the distance 800 (FIG. 2) between the sidewall 81 of the rim 80 and the center housing 10 of the device 1. Further yet, the friction grip 40 of the second embodiment may also remain substantially within the rim 80 cavity, without increasing the total vehicle width. The second embodiment, the fiction grips 40 may be suitable for use with wide profile tires 90 (in comparison).

Although embodiments of the device for increasing tire friction are shown and described therein, it should be understood that various changes and modifications to the presently preferred embodiments will be apparent to those skilled in the art. Such changes and modifications may be made without departing from the spirit and scope of the device for increasing tire friction and without diminishing its attendant advantages. It is, therefore, intended that such changes and modifications be covered by the appended claims.

I claim:

1. A device for increasing friction of a tire on a slippery surface comprising:
    a center housing having a top side, a bottom side and an interior and wherein the bottom side of the center housing is secured to a wheel assembly;
    a plurality of connection sectors located within the interior of the center housing; and
    a plurality of wires having a length, a first end and a second end and wherein the first end of one respective wire is secured within a respective one of the plurality of connection sectors wherein each respective wire passes through a channel located in each respective one of a plurality of friction grips and wherein the friction grips are independently secured over the tire of a wheel in an active second position and wherein a friction grip is secured directly to the center housing while the device is in an inactive first position so as to extend both axially and radially outwardly between the center housing and a sidewall of a rim of the wheel.

2. The device for increasing friction of a tire on a slippery surface of claim 1 further comprising:
    a protrusion on a first end of each of the friction grips wherein the protrusion is partially inserted within an opening of the connection sector while the device is in the inactive first position.

3. The device for increasing friction of a tire on a slippery surface of claim 2 wherein centripetal force created from the rotation of the device forces debris out of the opening of the connection sector.

4. The device for increasing friction of a tire on a slippery surface of claim 1 further comprising:
    a wheel located within an interior of each connection sector wherein first end of the wire is secured to the wheel and wherein more of the length of the wire is wrapped around the wheel in the inactive first position than is wrapped around the wheel in the active second position.

5. The device for increasing friction of a tire on a slippery surface of claim 4 wherein the wheel of the connection sector is in a perpendicular orientation with respect to the bottom of the center housing.

6. The device for increasing friction of a tire on a slippery surface of claim 4 further comprising:
    a shaft having a first end wherein the shaft is associated with and controls the wheel of the connection sector and wherein the first end of the shaft extends outside of the interior of the center housing and wherein the tightening or loosening of the first end of the shaft rotates the wheel of the connection sector and therein pulls or loosens the wire.

7. The device for increasing friction of a tire on a slippery surface of claim 4 further comprising:
    a second wheel located within the interior of the connection sector wherein the second wheel alters the direction of the wire exiting the connection sector and wherein the second wheel reduces the force of the wire on the wheel.

8. The device for increasing friction of a tire on a slippery surface of claim 4 further comprising:
    a center pivoted arm having a first end and a second end located within the connection sector wherein the first end of the center pivoted arm is connected to a spring and wherein the second end of the center pivoted arm pivots upward when the spring is depressed and wherein the upward pivoting of the center pivoted arm allows the wheel to rotate.

9. The device for increasing friction of a tire on a slippery surface of claim 1 wherein the orientation of the friction grips are rotated 180 degrees with respect to the wire when the friction grips move from the inactive first position to the active second position.

10. The device for increasing friction of a tire on a slippery surface of claim 1 further comprising:
    a plurality of protrusions on a bottom side of the friction grips wherein the plurality of protrusions of the friction grips contact the tire while the device is in the active second position.

11. The device for increasing friction of a tire on a slippery surface of claim 1 further comprising:
    a plurality of protrusions on the top side of the friction grips wherein the plurality of protrusions on the top side of the friction grips contact a road while the device is in the active second position.

12. The device for increasing friction of a tire on a slippery surface of claim 1 wherein less than all the friction grips may be used.

13. The device for increasing friction of a tire on a slippery surface of claim 1 further comprising:

a securing disk having a plurality of securing points and an opening wherein the opening of the securing disk is placed around the axle of a wheel assembly and wherein the second end of the plurality of wires are secured to a plurality of securing points of the securing disk.

14. The device for increasing friction of a tire on a slippery surface of claim 1 further comprising:
a slit along the friction grip wherein the slit runs parallel with respect to the friction grip and wherein the wire passes through the slit of the friction grip.

15. The device for increasing friction of a tire on a slippery surface of claim 1 further comprising:
an elongated lip portion at an end of the friction grip wherein the elongated lip portion partially contacts a sidewall of the tire.

16. The device for increasing friction of a tire on a slippery surface of claim 1 wherein the friction grip is secured to the connection sector in the inactive position at an angle between approximately zero and ninety degrees.

17. The device for increasing friction of a tire on a slippery surface of claim 1 wherein the friction grips are bendable and are bent to conform with the shape of the tire.

18. The device for increasing friction of a tire on a slippery surface of claim 1 further comprising:
an opening in the connection sector wherein the wire passes through the connection sector and wherein the opening has a circumference slightly greater than a circumference of the wire and wherein debris is cleaned off the wire as the wire passes through the opening of the connection sector.

19. A device for increasing friction of a tire on a slippery surface comprising:
a center housing having a top side, a bottom side and an interior and wherein the bottom side of the center housing is secured to a wheel assembly and wherein the bottom side is defined by a circumference having an area;
a plurality of connection sectors located within the interior of the center housing;
a plurality of wires having a length, a first end and a second end and wherein the first end of one respective wire is secured within a respective one of the plurality of connection sectors;
a plurality of friction grips wherein the friction grips are independently secured over the tire of a wheel in an active second position and wherein the friction grips are secured directly to the center housing while the device is in an inactive first position;
a wheel located within each of the plurality of connection sectors; and
wherein the friction grips extend both axially and radially outwardly between the center housing and a sidewall of a rim of the wheel.

20. The device for increasing friction of a tire on a slippery surface of claim 19 further comprising:
a cap on the top side of the center housing wherein the cap covers less area than the area defined by the circumference of the bottom side of the center housing.

21. The device for increasing friction of a tire on a slippery surface of claim 19 wherein the wheel has teeth.

22. The device for increasing friction of a tire on a slippery surface of claim 19 wherein each of the plurality of wires is secured to the wheel of each connection sector.

23. The device for increasing friction of a tire on a slippery surface of claim 19 further comprising:
an aperture located on the bottom side of the center housing wherein the aperture accepts an adaptor bolt which in turn accepts a bolt of the wheel assembly.

24. A device for increasing friction of a tire on a slippery surface comprising:
a center housing having a top side, a bottom side and an interior and wherein the bottom side of the center housing is secured to a wheel assembly;
a plurality of connection sectors located within the interior of the center housing; and
a plurality of wires having a length, a first end and a second end and wherein the first end of one respective wire is secured within a respective one of the plurality of connection sectors wherein each respective wire passes through a channel located in each respective one of a plurality of friction grips wherein the friction grips have a length which is greater than a distance between the center housing and a sidewall of a rim and wherein the friction grips are independently secured over the tire of a wheel in an active second position and wherein a friction grip is secured in a non-perpendicular manner directly to the center housing while the device is in an inactive first position;
a protrusion on a first end of each of the friction grips wherein the protrusion is partially inserted within an opening of the connection sector while the device is in the inactive first position;
wherein centripetal force created from the rotation of the device forces debris out of the opening of the connection sector; and
wherein the friction grips extend both axially and radially outwardly between the center housing and the sidewall of the rim of the wheel.

* * * * *